United States Patent
Wolff

(10) Patent No.: US 7,462,224 B2
(45) Date of Patent: Dec. 9, 2008

(54) ARRAY OF SHAPED ACTIVATED CARBON ARTICLES FOR TANK VENTING SYSTEMS AND MOTOR VEHICLES

(75) Inventor: Thomas Wolff, Munchberg (DE)

(73) Assignee: Helsa-Automotive GmbH & Co. KG, Gefrees (DE)

( * ) Notice: Subject to any disclaimer, the term of this patent is extended or adjusted under 35 U.S.C. 154(b) by 424 days.

(21) Appl. No.: 11/304,216

(22) Filed: Dec. 15, 2005

(65) Prior Publication Data
US 2006/0142154 A1 Jun. 29, 2006

(30) Foreign Application Priority Data
Dec. 23, 2004 (DE) .................. 10 2004 063 434

(51) Int. Cl.
*F02M 33/02* (2006.01)
*B01D 53/04* (2006.01)
(52) U.S. Cl. .................. 96/132; 123/519
(58) Field of Classification Search .............. 96/108, 96/121, 131, 132, 134, 147; 123/518–520; 502/416; 428/116, 118
See application file for complete search history.

(56) References Cited

U.S. PATENT DOCUMENTS

| | | | |
|---|---|---|---|
| 4,386,947 A | 6/1983 | Mizuno et al. | |
| 4,564,496 A | 1/1986 | Gupta et al. | |
| 5,429,782 A | 7/1995 | Masutani et al. | |
| 5,957,114 A | 9/1999 | Johnson et al. | |
| 6,503,301 B2 | 1/2003 | Uchino et al. | |
| 6,540,815 B1 | 4/2003 | Hiltzik et al. | |
| 2002/0124732 A1* | 9/2002 | Hara et al. ............. | 96/131 |
| 2003/0019361 A1* | 1/2003 | Wolff et al. ............. | 96/134 |
| 2003/0168757 A1 | 9/2003 | Bauer et al. | |
| 2003/0180538 A1 | 9/2003 | Gray | |

FOREIGN PATENT DOCUMENTS

| | | |
|---|---|---|
| DE | 199 52 092 C1 | 10/2000 |
| DE | 101 04 882 A1 | 8/2002 |
| DE | 101 50 062 A1 | 2/2003 |

(Continued)

OTHER PUBLICATIONS

Greil et al., "Effect of microstructure on the fracture behavior of biomorphous silicon carbide ceramics", Journal of the European Ceramic Society, 2002, 2697-2707, vol. 22(14-15).

*Primary Examiner*—Frank M Lawrence
(74) *Attorney, Agent, or Firm*—Fulbright & Jaworski, LLP

(57) ABSTRACT

The invention relates to an array of shaped activated carbon articles having channels extending through said array of shaped activated carbon articles, wherein said array of shaped activated carbon articles includes at least two shaped monolithic activated carbon articles containing channels, which channels of the at least two shaped monolithic activated carbon articles are connected so as to communicate with each other and the free cross-sectional areas formed by the channel cross-sections thereof have different values in said first and second shaped monolithic activated carbon articles. The invention also relates to a tank venting system and a motor vehicle containing an array of shaped activated carbon articles of the invention. Finally, the invention relates to a process for the production of said array of shaped activated carbon articles of the invention.

28 Claims, 8 Drawing Sheets

FOREIGN PATENT DOCUMENTS

| | | |
|---|---|---|
| DE | 102 13 016 A1 | 10/2003 |
| EP | 1 200 343 B1 | 10/2003 |
| EP | 1514588 | 3/2005 |
| EP | 1541817 | 6/2005 |
| WO | WO 00/78138 A2 | 12/2000 |
| WO | WO 01/62367 A1 | 8/2001 |

* cited by examiner

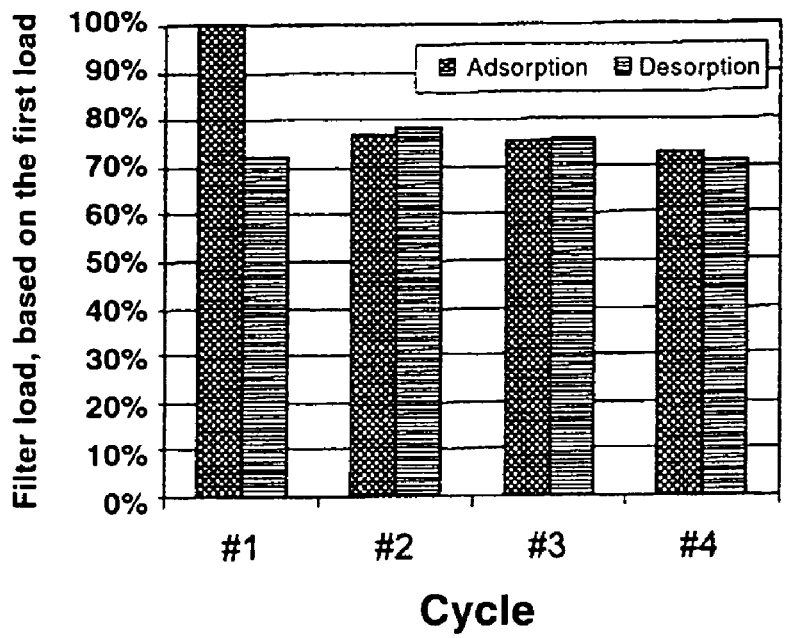
Fig. 8: Adsorptive capacity of a monolith containing 200 cpsi with 65% open area and wall thicknesses of 220 μm
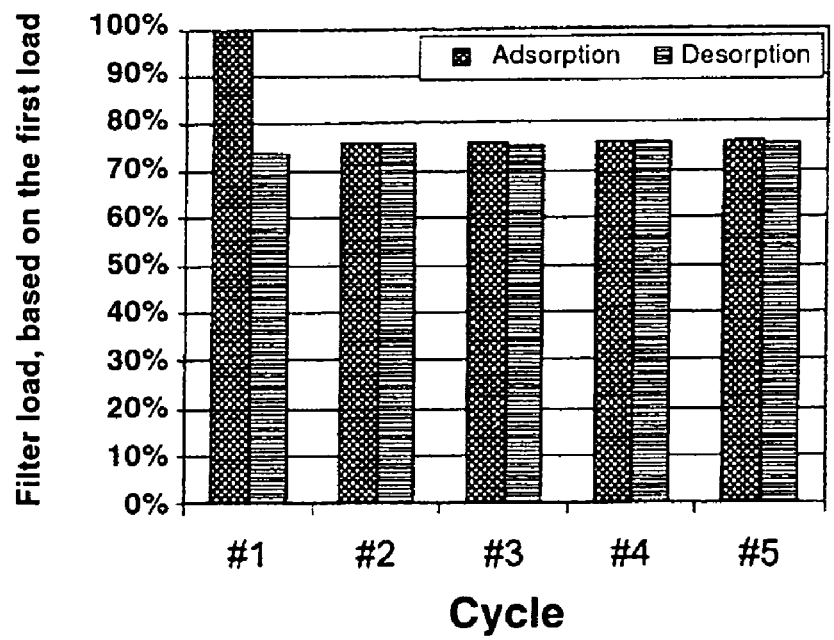
Fig. 9: Adsorptive capacity of a monolith having 27% open area and wall thicknesses according to Figure 10

ARRAY OF SHAPED ACTIVATED CARBON ARTICLES FOR TANK VENTING SYSTEMS AND MOTOR VEHICLES

CROSS-REFERENCE TO RELATED APPLICATIONS

This application claims priority to German application DE 102004063434.3 filed Dec. 23, 2004.

TECHNICAL FIELD

The invention relates to a shaped activated carbon article and to a process for the production thereof. In addition, the invention relates to a tank venting system and to a motor vehicle.

BACKGROUND OF THE INVENTION

Shaped activated carbon articles are used in the automobile industry, in particular in tank venting systems, for the reduction of evaporative emissions from a motor fuel supply system. Hydrocarbons emitted by a motor fuel reservoir as a result of an increase in pressure, particularly when the motor vehicles are not in motion and are exposed, for example, to direct solar radiation in the summer months, are retained by such tank venting systems to prevent such emissions from passing into the environment.

The tank venting systems or tank venting filters can consist of single-chamber or multi-chamber systems having activated carbon packings. Twin-chamber systems are disclosed in U.S. Pat. No. 5,957,114 or U.S. Pat. No. 6,503,301.

DE 199 52 092 C1 discloses an activated carbon filter which comprises a filter section containing activated carbon and a filter layer of high capacity adsorbent containing a material comprising zeolite and/or silica gel and/or alumina and/or divinylbenzenestyrene.

WO 01/62367 discloses a method for the adsorption of hydrocarbon vapors from motor fuel gas mixtures, in which the gas mixture is initially passed through a first adsorption system and then through a second adsorption system, and in which the adsorption rate of the second adsorption system is higher than the adsorption rate of the first adsorption system. The first and second adsorption systems can both consist of activated carbon, the surface area to volume ratio of which differs in the two systems.

The aforementioned filter systems all use activated carbon packings, which suffers from the drawback that they all show a very high pressure drop.

In order to achieve good regenerability of activated carbon packings, the particle size of the activated carbon used must be as small as possible. The use of activated carbon of such minimum size leads adversely to an even greater pressure drop in the aforementioned systems.

If a tank venting system or a tank venting filter is to show a low pressure drop combined with good regenerability, use must be made of monolithic structures containing an adsorbent.

U.S. Pat. No. 4,386,947 discloses a device for the adsorption of motor fuel vapors, in which first, second and third monolithic structures comprising activated carbon are laminated together such that the passages in the monolithic structures form a zigzag path, through which the gas or vapor is passed. This arrangement is too complicated for normal manufacturing technology and too cost-intensive in regard of the fact that the tank venting systems are mass products.

U.S. Pat. No. 6,540,815 B1 discloses a method for the reduction of motor fuel vapors in automobiles, in which the vapors are passed initially through an activated carbon packing and subsequently through an activated carbon-containing shaped ceramic article having a honeycomb structure. The method disclosed in U.S. Pat. No. 6,540,815 B1 suffers from the disadvantage that, on the one hand, an activated carbon packing must be used, which, as explained above, produces a high pressure drop, and, on the other hand, the activated carbon-containing ceramic honeycomb filter contains not more than approximately 35% by weight of activated carbon on account of the content of ceramics material and consequently has a restricted adsorptive capacity.

A further disadvantage arising when use is made of activated carbon packings in a motor vehicle is that when the motor vehicle is in motion the activated carbon packing is subjected to vibrations causing the activated carbon particles to rub against one another. The rubbing of the activated carbon particles against one another produces abrasion and leads to pulverization of the activated carbon, whereby the adsorptive capacity of the activated carbon packing is impaired.

It is an object of the invention to provide an adsorbent, preferably for the adsorption of hydrocarbon vapors, in a form which enables a good adsorptive capacity to be combined with a low pressure drop.

BRIEF SUMMARY OF THE INVENTION

The object underlying the invention is achieved by providing an array of shaped activated carbon articles having channels extending through said array of shaped activated carbon articles, which array of shaped activated carbon articles contains at least two shaped monolithic activated carbon articles having channels, which channels of the at least two shaped monolithic activated carbon articles are connected so as to communicate with one another and the free cross-sectional areas formed by the channel cross sections differ in said first and second shaped monolithic activated carbon articles.

Preferred embodiments of the invention are specified in the subclaims.

The object underlying the invention is furthermore achieved by providing a process for the production of an array of shaped activated carbon articles according to the invention, comprising the following steps:

(a) blending carbon particles, binder, liquid phase, and optionally further auxiliaries to provide an extrudable composition, (b) extruding the composition obtained in step (a) to give shaped monolithic articles having channels, (c) drying the shaped articles obtained in step (b), (d) carbonizing the dried shaped articles to produce shaped carbon articles, (e) optionally activating the carbonized shaped carbon articles, (f) arranging at least two shaped activated carbon articles, in which the free cross-sectional areas formed by the channel cross-sections differ from each other, in such a manner that the channels of the at least two shaped activated carbon articles are connected so as to communicate with one another.

For the purposes of the invention, the term "carbon particles" is understood as meaning particles of carbon and carbon-containing particles. That is to say, the particles can also contain other constituents in addition to carbon. These other constituents are preferably pyrolyzed and/or converted to carbon during carbonization.

Preferably, the carbon particles consist mainly of carbon material, and more preferably the carbon particles consist almost entirely of carbon material. Very preferably, the carbon particles consist exclusively of carbon material. The starting material can be coke from all kinds of parent substance, for example wood, peat, stone fruit kernels, nutshells, anthracite, and/or lignite.

According to a further preferred embodiment, the carbon material used is activated carbon.

Activation according to step (e) is preferably only carried out if the carbon particles used are not activated carbon particles. That is to say, activation according to step (e) is not necessary if activated carbon is used as the carbon particles.

The shaped monolithic activated carbon articles are preferably obtained by extrusion, and consequently exhibit an elongated form. During the production of the shaped monolithic activated carbon articles by extrusion, the resulting extrudate can be cut to length as required. The channels present in the shaped monolithic activated carbon article preferably extend substantially parallel to one another. Furthermore it is preferred that the channels extend substantially parallel to the longitudinal axis of the shaped monolithic activated carbon article. The channels in this case preferably extend right through the shaped activated carbon article, i.e., for example, from a first end face normal to the longitudinal axis of the shaped activated carbon article up to a second such face. The shaped monolithic activated carbon article can in this case be in the form of a cuboid or a cylinder. The geometry of the cross-section normal to the longitudinal axis of the shaped monolithic activated carbon article can be trigonal, tetragonal, preferably square, pentagonal, hexagonal, octagonal, decagonal, round, or oval. Basically, any desired external geometry of the shaped monolithic activated carbon articles can be used to allow for the particular spatial conditions in, for example, a motor vehicle.

The channels of the at least two shaped monolithic activated carbon articles are connected so as to communicate with one another. That is to say, gases or vapors can pass from the channels of a first shaped monolithic activated carbon article to the channels of a second shaped monolithic activated carbon article. If the array of shaped activated carbon articles consists of more than two shaped monolithic activated carbon articles, for example of three, four, five or more shaped monolithic activated carbon articles, all channels of these shaped monolithic activated carbon articles will be connected so as to communicate with one another, such that the gases or vapors will pass successively through the channels of all succeeding shaped monolithic activated carbon articles so as to cause a depletion of pollutants, for example a depletion of hydrocarbons, in the air.

The channels of the two, three, four, five, or more successively arranged shaped monolithic activated carbon articles can in this case be arranged directly abutting one another. For example, it is possible for the end faces of the various shaped monolithic activated carbon articles to be arranged directly abutting one another.

The shaped monolithic activated carbon articles can in this case be glued or joined to one another by means of adhesives, for example by means of adhesives applied to the end faces. Alternatively however, the shaped activated carbon articles may be arranged successively in an envelope, for example in a shrinkage tube or a housing, in which case the end faces of the shaped monolithic activated carbon articles can again be arranged abutting one another. Of course, it is also possible for the shaped monolithic activated carbon articles to be arranged at a distance from one another. For example, the shaped monolithic activated carbon articles can be arranged in a shrinkage tube such that the shrinkage tube contracts between two adjacently arranged shaped monolithic activated carbon articles and a gas-tight or vapor-tight connection forms between the adjacent shaped monolithic activated carbon articles. The two, three, four, or more shaped monolithic activated carbon articles can also be arranged at a distance from one another in a gas-tight or vapor-tight housing. In this case, the shaped monolithic activated carbon articles can be arranged parallel to one another in such a housing for the purpose of saving space.

The free cross-sectional areas of the first and second shaped monolithic activated carbon articles have different values. The free cross-sectional area is formed by the sum of the cross-sectional areas of the channels in a cross-section normal to the longitudinal axis of the shaped activated carbon article.

According to a preferred embodiment, the activated carbon content in the shaped activated carbon articles is at least 75% by weight, based on the total weight of the shaped activated carbon articles. Furthermore, the activated carbon content is preferably at least 80% by weight, more preferably at least 90% by weight, very preferably at least 95% by weight, and most preferably at least 98% by weight, in each case based on the total weight of the activated carbon articles. According to a very preferred embodiment, the activated carbon content in the shaped activated carbon articles is 100% by weight, based on the total weight of the activated carbon article.

It has been found, surprisingly, that shaped activated carbon articles having an extremely high content of activated carbon, preferably containing 95% to 100%, by weight, of activated carbon, can be produced with good mechanical stability. On account of the high activated carbon content, the adsorptive capacity of the shaped activated carbon articles is extremely high.

The activated carbon used is preferably an open-pore activated carbon having a high content of mesopores. The mesopore volume of such activated carbons customarily lies in the range of from 0.2 to 1.1 ml/g, the mesopores usually having an average pore size of from 20-300 Å in diameter. For the purposes of the present invention, activated carbon BAX 1100 from Mead Westvaco Corporation USA, CNR 115 from Norit Nederland B.V. or activated carbon 1155-2 from German Carbon Teterow GmbH, Germany can be used, for example. The pore distribution in the shaped monolithic activated carbon articles is consequently based on the pore distribution in the types of activated carbon used. Therefore the shaped monolithic activated carbon articles used in the array of shaped activated carbon articles according to the invention have a large content of mesopores. The channels in the shaped activated carbon articles can have a trigonal, tetragonal, preferably square, pentagonal, hexagonal, octagonal, round, or oval cross-section. Preferably, the channels have a round or hexagonal cross-section. Very preferably, the channel cross-section has a hexagonal geometry.

According to a further preferred embodiment, the array of shaped activated carbon articles contains at least three shaped monolithic activated carbon articles whose channels are connected so as to communicate with one another.

It is furthermore preferred that the free cross-sectional area formed by the channel cross-sections increases from one shaped monolithic activated carbon article to the next. That is to say, the free cross-sectional area formed by the channel cross-sections increases from the first to the second and from the second to the third shaped monolithic activated carbon article or to any further shaped activated carbon article disposed in the array of shaped activated carbon articles.

Preferably, the free cross-sectional area formed by the channel cross-sections in consecutive shaped monolithic activated carbon articles increases in each case by from 5 to 60% and preferably by from 10 to 50%. These percentages refer in each case to the free cross-sectional area of the foregoing shaped activated carbon article formed by the channel cross-sections.

Preferably, the free cross-sectional area formed by the channel cross-sections in a first shaped monolithic activated carbon article is from 10% to less than 35%, preferably from 20% to 30%, these figures referring to the percentage area formed by the channel cross-sections, based on the total cross-sectional area of the shaped activated carbon article.

Furthermore, it is preferred that the free cross-sectional area formed by the channel cross-sections in a second shaped monolithic article is from 35% to not more than 60%, preferably from 40% to 55%, these figures referring to the percentage area formed by the channel cross-sections, based on the total cross-sectional area of the shaped activated carbon article.

It is furthermore preferred that the free cross-sectional area formed by the channel cross-sections in a third shaped monolithic activated carbon article is more than 60% to less than 80%, preferably from 65% to 75%, these figures referring to the percentage area formed by the channel cross-sections, based on the total cross-sectional area of the shaped activated carbon article.

Thus, in the array of shaped activated carbon articles according to the invention, shaped monolithic activated carbon articles having different free cross-sectional areas are combined with one another. When using this array of shaped activated carbon articles, for example in tank venting, the shaped activated carbon article having the smallest free cross-sectional area is positioned near to the pollutant source, for example a motor vehicle tank, whilst on the side remote from the pollutant source, for example the atmosphere side of a motor vehicle, that shaped activated carbon article which has the largest free cross-sectional area is disposed. That is to say, from the side of a gas emitting or vapor emitting pollutant source, for example the tank side of a motor vehicle, to the side remote from the pollutant source, for example the atmosphere side of a motor vehicle, the free cross-sectional areas formed by the channel cross-sections in the shaped monolithic activated carbon articles arranged in the array of shaped activated carbon articles increases from, say, a first shaped monolithic activated carbon article to the second such article and from the second to a third such article, and so on.

It has been found, surprisingly, that the array of shaped activated carbon articles according to the invention produces an extremely low pressure drop compared with an activated carbon packing. Depending on the inflow area used and the length of the array of shaped activated carbon articles, the pressure drop can be 90% less than the pressure drop of an activated carbon packing having a comparable adsorptive capacity. The pressure drop across the array of shaped activated carbon articles according to the invention, is consequently markedly lower than that incurred across an activated carbon packing having a comparable adsorptive capacity. Preferably, the pressure drop across the array of shaped activated carbon articles according to the invention is at least 20% lower, more preferably at least 50% lower, and most preferably at least 70% lower, than that produced across a conventional activated carbon packing having a comparable adsorptive capacity.

It has been found, surprisingly, that effective and reliable adsorption of gaseous or vaporous pollutants, for example hydrocarbon vapors, can be achieved by means of the array of shaped activated carbon articles according to the invention. The cross-sectional diameter of the channels in the shaped activated carbon articles preferably lies in the range of from 0.1 mm to 7 mm, preferably from 0.5 mm to 4.5 mm, and more preferably from 0.8 mm to 2.2 mm.

The channel walls separating the channels preferably have a thickness in the range of from 0.5 mm to 10 mm, preferably from 0.8 mm to 5 mm, and more preferably from 1 mm to 3 mm.

The shaped activated carbon article according to the invention thus shows, on the one hand, good stability, i.e. high mechanical strength, and, on the other hand, a low pressure drop and an outstanding adsorptive capacity.

According to a preferred refinement of the invention, the array of shaped activated carbon articles has a ratio of length to cross-sectional diameter of at least 3:1, preferably at least 4:1, more preferably of at least 6:1, and most preferably of at least 8:1. It has been found, surprisingly, that the adsorptive capacity and the bleeding behavior can be further optimized if the array of shaped activated carbon articles has a small inflow area and is of a large length.

Unlike the activated carbon packing customarily used, the array of shaped activated carbon articles according to the invention makes it possible to achieve an optimum ratio of length to cross-sectional diameter without the resulting pressure drop being unduly high, as would occur with an activated carbon packing.

Preferably, the array of shaped activated carbon articles has an incremental adsorption capacity of more than 35 g/l between levels of 5% and 50%, by volume, of n-butane in air. The incremental adsorption capacity is obtained from the adsorption isotherm recorded with mixture ratios of n-butane in air by subtracting the adsorption value at 5% by volume of n-butane from the value at 50% by volume of n-butane. The value is standardized to a volume of 1 liter. More preferably, each individual shaped activated carbon article in the overall array has this adsorptive property, i.e. a system of at least two in-line adsorptive filters (or alternatively adsorptive volumes) results, each of which has an incremental adsorption capacity of of more than 35 g/l between levels of 5% and 50% of n-butane in air.

In order to produce the shaped activated carbon articles according to the invention, carbon particles, binder, liquid phase, and optionally further auxiliaries are first of all blended to provide an extrudable composition. The liquid phase used is preferably water or an aqueous solution. In addition to binders based on water, the use of non-aqueous or substantially anhydrous binders, for example those based on pitch, coal tar, charcoal tar, and/or bitumen, is possible. Further auxiliaries which can be added are, for example, plasticizers and/or lubricants. A plasticizer can improve the processability or extrudability of the composition to be extruded. A lubricant assists the homogeneous dispersion of the individual constituents during the extrusion of the composition in the nozzle of the extruder. In addition, local damming effects in individual channels of the nozzle during extrusion can be avoided in an extremely advantageous manner by increasing the degree of internal slip.

The lubricants used can be surfactants or soaps, for example fatty acids or fatty acid salts, such as stearates, in order to improve the slip of the composition in the extruder or its mold. A plasticizer suitable for use is, for example, a cellulose ether.

Cellulose ethers which can be used are, for example, methyl cellulose, ethylhydroxyethyl cellulose, hydroxybutyl cellulose, hydroxybutylmethyl cellulose, hydroxyethyl cellulose, hydroxymethyl cellulose, hydroxypropyl cellulose, methylhydroxypropyl cellulose, hydroxyethylmethyl cellulose, sodium carboxymethyl cellulose, or mixtures thereof.

Binders which have proven very suitable are water-containing binders. Binders which can be used are, for example, carbohydrates, starch, sugars, and/or mixtures thereof. Sugars which have proven very suitable are sugar mixtures, preferably molasses. In addition to binders based on water, the use of non-aqueous binders, for example those based on pitch, coal tar, charcoal tar, or bitumen, is possible.

The carbon particles employed are preferably of coke based on wood, peat, stone fruit kernels, nutshells, anthracite, or lignite. Preferably, finely ground charcoals or activated carbon powders based on wood or coconut shells are employed as carbon particles.

The shaped monolithic article having channels obtained after extrusion is preferably cut to desired lengths and subsequently dried. Drying is preferably carried out in a forced air oven at approximately 50° C. to approximately 100° C. However, it is alternatively possible to use other drying methods such as, for example, microwave techniques. After drying, the shaped monolithic article preferably has a water content of 25% by weight or less.

Carbonization of the dried shaped article is preferably carried out in the range of from approximately 500° C. to 850° C., preferably at approximately 600° C. to 700° C. The respective final temperature is maintained until substantially no more pyrolysis products or decomposition products are given off. During carbonization, the auxiliaries added, such as, for example, wax, surfactant, soap, cellulose ether, or starch, are decomposed and the binder used, such as molasses or tar, is carbonized. The shaped carbon article obtained after carbonization preferably consists of carbon, preferably activated carbon, to an extent of more than 75% by weight, preferably more than 80% by weight, and more preferably more than 90% by weight. According to another preferred embodiment, the shaped activated carbon article consists, after carbonization, of carbon to an extent of at least 95% by weight, preferably at least 98% by weight, and more preferably 100% by weight. These percentages by weight are based in each case on the total weight of the shaped carbon article, preferably the shaped activated carbon article.

When using an activated carbon as carbon particles, the shaped article obtained after carbonization does not have to be further activated. If a non-activated coke is used as the carbon material, downstream activation must be carried out. This activation can be carried out in conventional manner. For example, activation of the shaped article can be carried out at a temperature of from 500° C. to 1000° C., preferably from 700° C. to 950° C., in an activating atmosphere containing, for example, from 25% to 35%, by volume, of steam.

In the production of the array of shaped activated carbon articles according to the invention, at least two shaped activated carbon articles having different free cross-sectional areas formed by the channel cross-sections are then arranged such that the channels of the at least two shaped activated carbon articles are connected so as to communicate with one another. As mentioned above, the at least two, preferably at least three, shaped activated carbon articles can be arranged either abutting one another or at a distance from one another. It is essential that the vapors or gases passing through the channels of the first shaped activated carbon article can subsequently pass into the channels of the second, or third, or any further shaped activated carbon articles, such that preferably all pollutants contained in the gases or vapors will be reliably adsorbed by the array of shaped activated carbon articles of the invention.

BRIEF DESCRIPTION OF THE DRAWINGS

The invention is explained below with reference to figures and exemplary embodiments which, however, are not to be regarded as restricting the scope of protection of the present invention.

In FIG. 1a), the channels 1 have a hexagonal cross-section, in FIG. 1b) a round cross-section, and in FIG. 1c) a square cross-section.

FIG. 8 shows the adsorptive capacity of a shaped monolithic article having 200 cpsi (cells per square inch) and a free cross-sectional area of 65% and wall thicknesses of 220 μm.

FIG. 9 shows the adsorptive capacity of a shaped monolithic article having hexagonal channels and a free cross-sectional area of 27% and wall thicknesses as in FIG. 10.

DETAILED DESCRIPTION OF THE INVENTION

EXAMPLES

Figure 1:
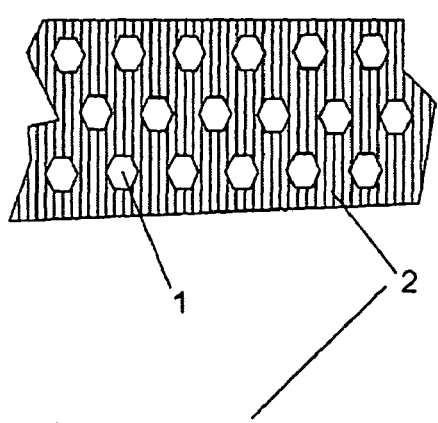
FIGS. 1a)-1c) show various embodiments of the shaped activated carbon article 2 having channels 1 used in the array of shaped activated carbon articles according to the invention.
Figure 1:
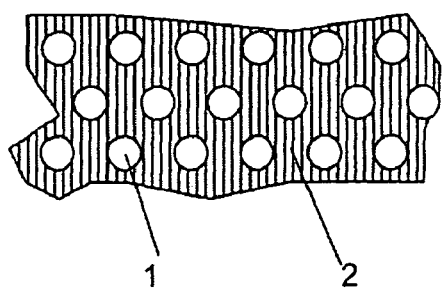
Figure 1:
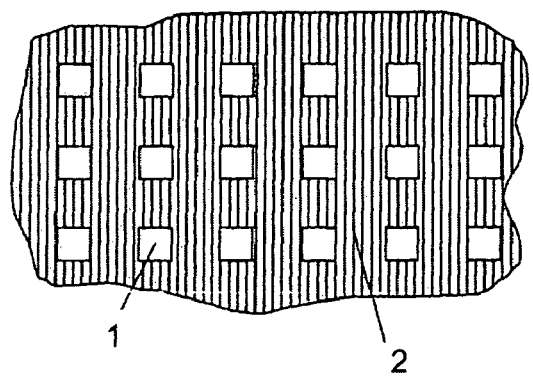

The adsorptive capacity or the adsorptive capacity and the pressure drop of various activated carbon filters were compared with one another.

Various activated carbon filters are listed in Table 1, which lists the production process, the activated carbon content, and the adsorptive capacity for n-butane for each filter.

TABLE 1

|  | Production process | Active carbon content % by weight | Filter geometry | Adsorptive capacity for n-butane, g/100 ml of 50% n-butane |
|---|---|---|---|---|
| Filter 1 | original CNR115 from Norit Nederland B.V. | 100% | Packed bed | 11.0 |

TABLE 1-continued

| | Production process | Active carbon content % by weight | Filter geometry | Adsorptive capacity for n-butane, g/100 ml of 50% n-butane |
|---|---|---|---|---|
| Filter 2 | DE 10213016 | 48% | Monolith with 27% open area, 52 mm in diameter, 100 mm in length | 5.2 |
| Filter 3 | DE 10104882 | 70% | Monolith with 27% open area, 52 mm in diameter, 100 mm in length | 8.5 |
| Filter 4 | DE 10003660, extrusion to a monolith instead of pressing to shaped carbon | 100% | Monolith with 27% open area, 52 mm in diameter, 100 mm in length | 11 |

Filter 1 is an activated carbon packing of activated carbon CNR 115 from Norit Nederland B.V., Netherlands. The activated carbon CNR 115 has an average particle size of 2 mm. The cylindrical packed bed had a length of 100 mm and a diameter of 30 mm and consisted of 100% by weight activated carbon. The inflow area was 7 cm².

Filter 2 was produced according to the production process described in DE 102 13 016 and contained, in addition to 48% by weight of activated carbon, the following constituents: 42% by weight of vitrified carbon (carbonized phenolic resin), 7.5% by weight of fireclay, and 2.5% by weight of silicate.

The cylindrical filter had a diameter of 52 mm and a length of 100 mm. The through channels extending along the longitudinal axis of the filter had a channel diameter of 1.4 mm and exhibited a hexagonal cross-section. The free cross-sectional area formed by the channel cross-sections was 27%. The inflow area was 21 cm².

Filter 3 was produced according to the production process described in DE 101 04 882 and contained, in addition to 70% by weight of activated carbon, the following constituents: 14% by weight of vitrified carbon (carbonized phenolic resin) and 16% by weight of clay. The dimensions of this filter are exactly the same as those of filter 2.

Filter 4 is a honeycomb article which likewise has the same dimensions as filter 2. Instead of using the formulation according to DE 102 13 016, however, the formulation as is described in WO 00/78138 A2 for the extrusion of 1 mm shaped activated carbons, is used. The extruded green molding is carbonized after drying at 550° C. and then immediately activated with steam at 850° C.

As can be seen from Table 1, filter 4 has an adsorptive capacity for n-butane comparable to that of Filter 1.

The pressure drop determined for various filter types is listed in Table 2 below.

TABLE 2

| Filter | Inflow area, cm² | Depth, cm | Pressure drop at 70 l/min |
|---|---|---|---|
| Packed bed | 21 | 10 | 689 Pa |
| Monolith with 27% free cross-sectional area | 21 | 10 | 63 Pa |
| Monolith with 27% free cross-sectional area | 21 | 20 | 115 Pa |
| Monolith with 27% free cross-sectional area | 10.5 | 20 | 231 Pa |
| Monolith with 27% free cross-sectional area | 7 | 30 | 560 Pa |

The pressure drop was in this case measured according to DIN 71460-1 in a flow channel having a diameter of 80 mm and at a volumetric flow rate of 70 l/min As can be seen from Table 2, the pressure drop produced by a shaped monolithic article having the same inflow area and depth and a free cross-sectional area of 27% formed by its channel cross-sections is only approximately 10% (63 Pa) of the pressure drop (689 Pa) produced by an activated carbon packing (packed bed of activated carbon) having the same external dimensions. On doubling the depth to 20 cm and keeping the same inflow area of 21 cm², the pressure drop produced by a shaped monolithic article having 27% free cross-sectional area is only approximately 16% of the pressure drop produced by an activated carbon packing having the same inflow area and a depth of 10 cm. Even on halving the inflow area of a shaped monolithic activated carbon article having a free cross-sectional area of 27% to 10.5 cm² and a depth of 20 cm, the pressure drop is still significantly lower than in the case of an activated carbon packing having an inflow area of 21 cm² and a depth of 10 cm. The pressure drop across the aforementioned shaped monolithic activated carbon article is only approximately 30% of the pressure drop across the said activated carbon packing.

Even with a further reduction in the inflow area to 7 cm² and an increase in the depth to 30 cm, the pressure drop is still lower than that produced by an activated carbon packing having an inflow area of 21 cm² and a depth of 10 cm.

From a comparison of the data listed in Table 1 and Table 2, it will be seen that a shaped monolithic article having an activated carbon content of 100% by weight has a similar n-butane adsorptive capacity to that of an activated carbon packing having an activated carbon content of 100% by weight, whilst the pressure drop across a shaped monolithic activated carbon article is significantly lower than that produced by an activated carbon packed bed.

Figure 2:
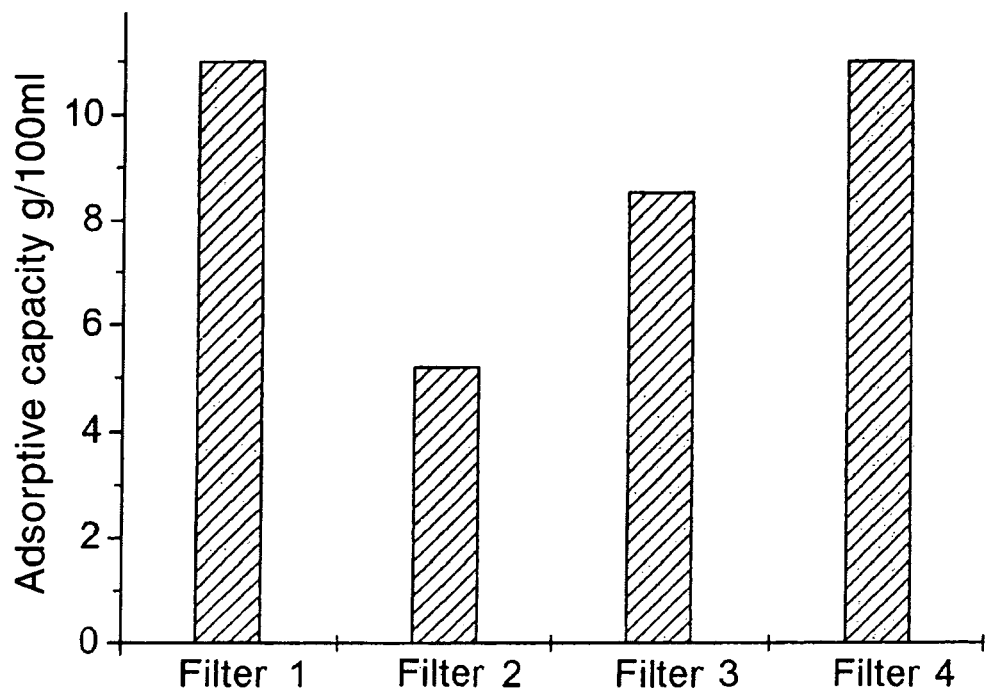
FIG. 2 shows the n-butane adsorptive capacities for the shaped activated carbon articles depicted in Table 1.

The data on n-butane adsorptive capacity listed in Table 1 are shown graphically in FIG. 2 in the form of a bar chart.

Figure 3:
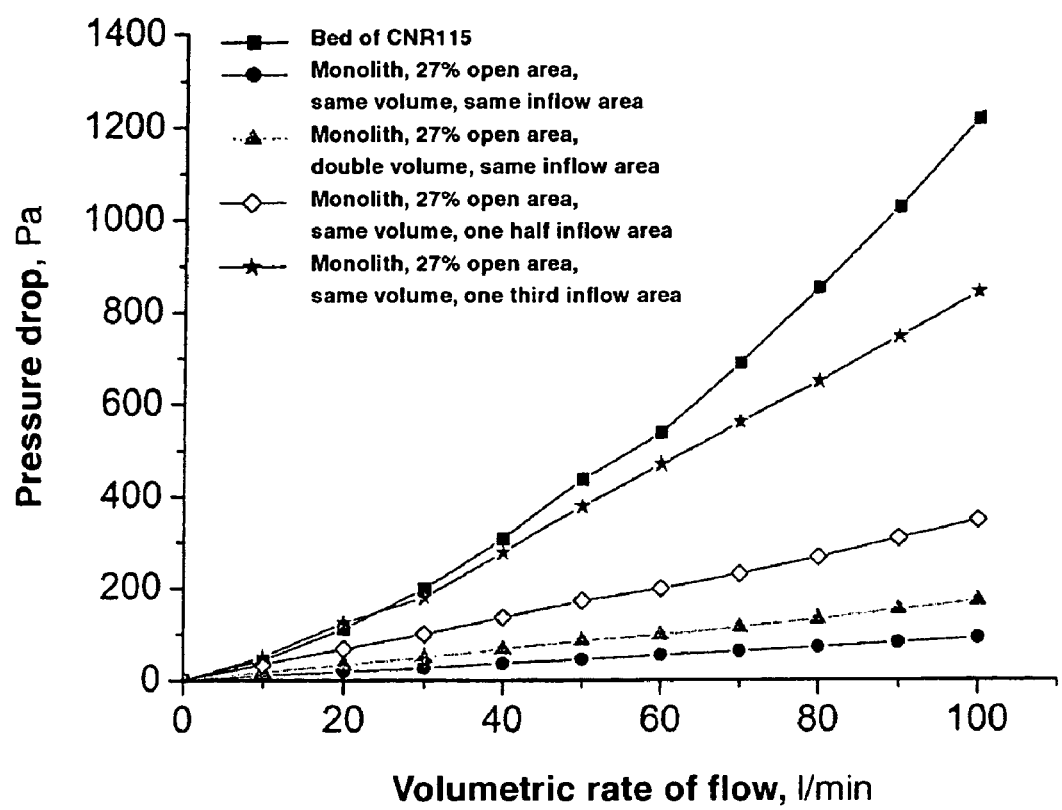
FIG. 3 shows the pressure drops as a function of the volumetric flow rate of an activated carbon packing in a packed bed filter compared with shaped monolithic activated carbon articles having different inflow areas.

In FIG. 3, the measured curves of the pressure drop across each of the activated carbon filters indicated in Table 2 are plotted as a function of the volumetric flow rate. The volume of all activated carbon filters was in each case 210 cm³, with the exception of the shaped monolithic article, which had an inflow area of 21 cm² and a depth of 20 cm and consequently a volume of 420 cm³.

FIG. 3 clearly shows that the pressure drop across monolithic shaped activated carbon articles is significantly lower than that incurred across an activated carbon packing (curve "Bed CNR 115" ■). Even on doubling the depth of a shaped monolithic activated carbon article, i.e. by doubling the volume (curve: "double volume" ▲), the pressure drop is only insignificantly higher than the pressure drop incurred across an activated carbon packing. By increasing the depth of a shaped monolithic activated carbon article, the diffusion length for gaseous or vaporous pollutants, for example hydrocarbons escaping from a motor vehicle tank, is consequently also increased. On doubling the depth of a shaped monolithic activated carbon article, the diffusion length for the gaseous or vaporous pollutants, for example hydrocarbons, is also doubled. By increasing the depth of the shaped monolithic activated carbon article or by increasing the diffusion length, the evaporative emissions of, for example hydrocarbons, from a partially loaded filter can be advantageously reduced. By reducing the inflow area and increasing the flow path, for example by reducing the inflow area by two thirds and tripling the depth of the shaped monolithic activated carbon article, i.e. by tripling the flow path, the evaporative emissions of pollutants, for example hydrocarbons, can be reduced still further. As can be seen from FIG. 3 (curve "one third inflow area" ★), such optimization of the shaped monolithic activated carbon article results in a pressure drop which is still lower by approximately 20% than that incurred across the activated carbon packing referred to for comparison.

Surprisingly, it has now been found that the reduction in the evaporative emissions and the regenerability can be further optimized by means of the array of shaped activated carbon articles of the invention.

Figure 4:
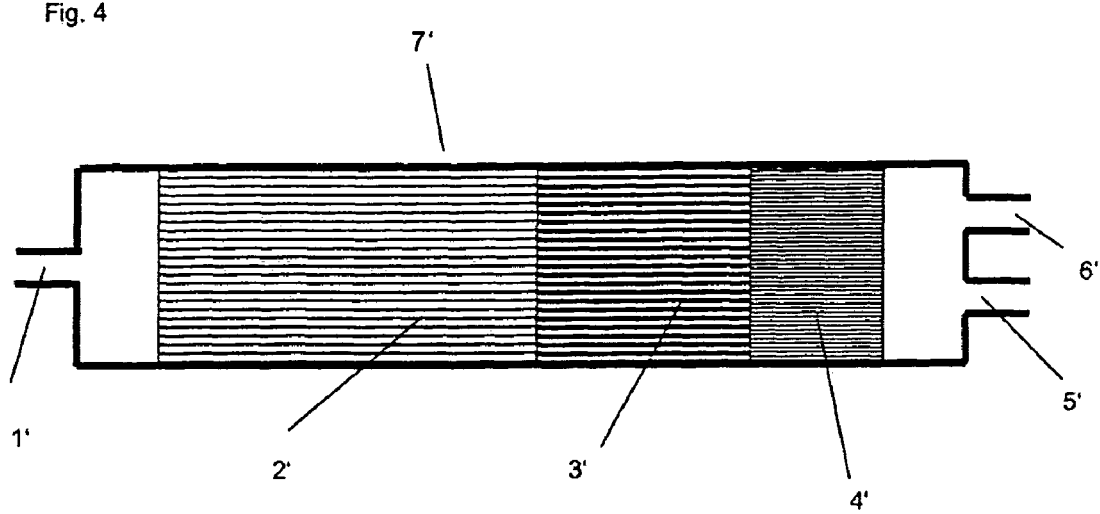
FIG. 4 is a diagrammatic representation of an array of shaped activated carbon articles according to the invention.

FIG. 4 is a diagrammatic representation of an array of shaped activated carbon articles according to the invention. The shaped monolithic activated carbon articles 2', 3' and 4' are arranged in succession, for example in a housing 7'. The housing 7' can, for example, be one made of plastic, stainless steel, a film or foil, or a shrinkage tube. The array of shaped activated carbon articles is in this case linked via the connection 1' to the pollutant source, for example a tank filled with motor fuel. The openings 5' and 6' are the outlets to the atmosphere or to the environment. The pollutants, for example hydrocarbons, emitted from a tank or motor vehicle, consequently enter the array of shaped activated carbon articles of the invention via connection 1'. The free cross-sectional area formed by the channel cross-sections preferably increases in this case from the shaped monolithic activated carbon article 2' to the shaped monolithic activated carbon article 3' and from the latter to the shaped monolithic activated carbon article 4'. For example, the free cross-sectional area of the shaped monolithic activated carbon article 2' shown in FIG. 4 can be barely less than 35%. The free cross-sectional area of the shaped monolithic activated carbon article 3' formed by the channel cross-sections can, for example, be between 35% and not more than 60%. The free cross-sectional area of the shaped monolithic activated carbon article 4' formed by the channel cross-sections is preferably more than 60%, for example 70%.

Figure 5:
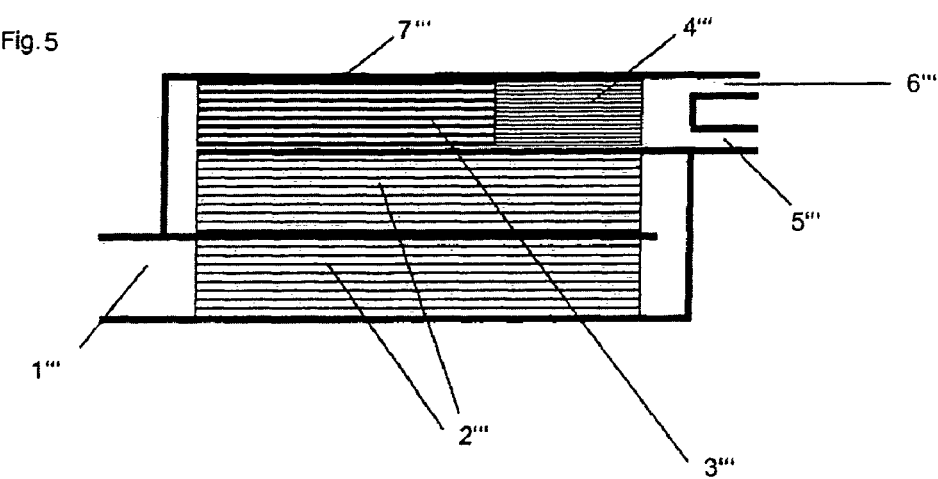
FIG. 5 is a diagrammatic representation of another embodiment of an array of shaped activated carbon articles according to the invention.

FIG. 5 shows another preferred embodiment of the array of shaped activated carbon articles of the invention. In this refinement of the array of shaped activated carbon articles according to the invention, two shaped monolithic activated carbon articles 2''' are disposed parallel to one another. The shaped monolithic activated carbon articles 3''' and 4''' are arranged in line, the array consisting of the shaped monolithic activated carbon articles 3''' and 4''' being parallel to the shaped monolithic activated carbon articles 2'''. The gaseous or vaporous substances, for example hydrocarbons, pass through the connector 1''' into the first shaped monolithic activated carbon article 2'''. At the end of the first shaped monolithic activated carbon article 2''', the unadsorbed pollutants then pass into the second shaped monolithic activated carbon article 2''' and subsequently into the downstream monolithic shaped activated carbon articles 3''' and 4'''' before the gases or vapors safeguarded from pollutants are emitted to the environment or atmosphere via the outlets 5''' and 6'''. The dual arrangement of the first shaped monolithic activated carbon article 2''' leads to a marked improvement in the reduction of residual emissions of pollutants to the environment. As can be seen from FIG. 3, doubling the length of the shaped monolithic activated carbon article 2''', i.e. doubling the diffusion path, leads to only an insignificant increase in the pressure drop.

Regarding the increase in the free cross-sectional area of the shaped activated carbon articles 2''' through 3'''' to 4'''' formed by the channel cross-sections, reference is made to the statements referring to FIG. 4.

Figure 6:
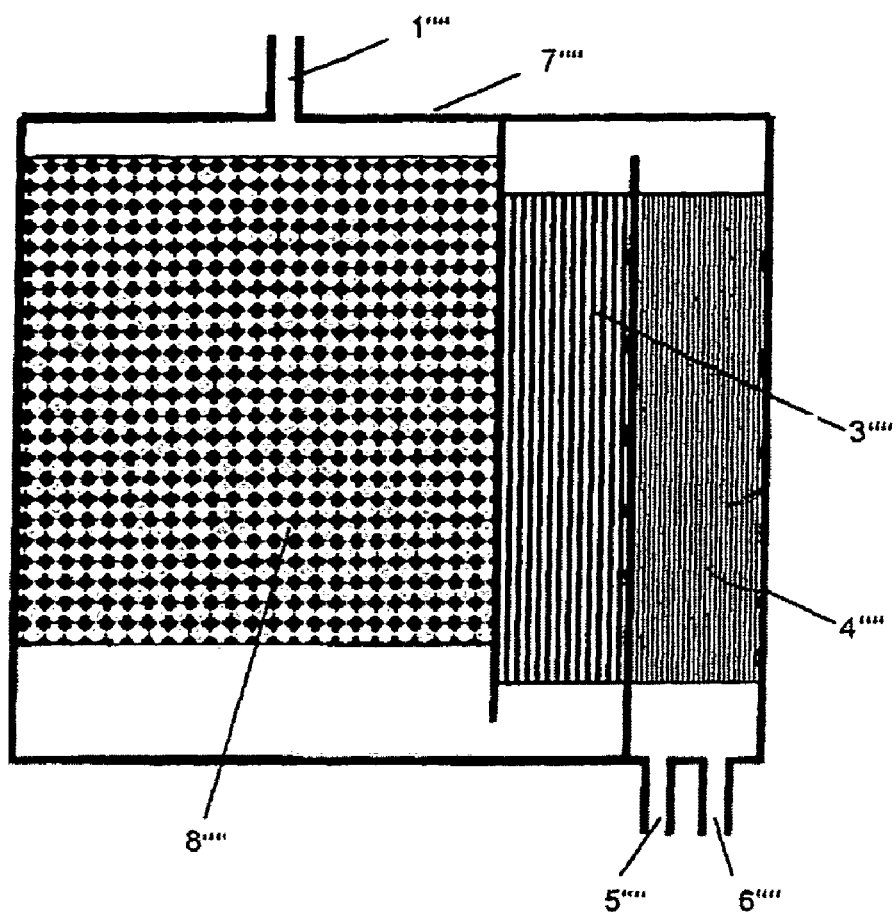
FIG. 6 is a diagrammatic representation of an array of shaped activated carbon articles of the invention combined with an activated carbon packing or a packed bed filter.

FIG. 6 depicts another possible embodiment of the present invention. The array of shaped activated carbon articles of the invention can be combined with a conventional activated carbon packing. In this arrangement, the array of shaped activated carbon articles according to the invention is downstream of the activated carbon packing. The gaseous or vaporous pollutants, for example hydrocarbons, pass through the connector 1'''' into the activated carbon packing 8''''. The residual pollutants escaping from the activated carbon packing 8'''', for example hydrocarbons, then enter into the array of shaped activated carbon articles according to the invention. The activated carbon packing 8'''' can in this case be arranged parallel to the shaped monolithic activated carbon article 3'''' for space optimization. The remaining pollutants escaping from the shaped monolithic activated carbon article 3'''' then enter into the shaped monolithic activated carbon article 4''''. The gases or vapors deplete of pollutants, preferably hydrocarbons, are then emitted to the environment or atmosphere via the outlets 5'''' or 6''''. The shaped monolithic activated carbon articles 3'''' and 4'''' are preferably likewise arranged parallel to one another. Regarding the increase in the free cross-sectional area formed by the channel cross-sections, reference is made to the statements referring to FIG. 4.

The parallel arrangement of shaped monolithic activated carbon articles, optionally in conjunction with an activated carbon packing, allows for a highly advantageous compact construction in a housing 7''''. The array of shaped activated carbon articles according to the invention, optionally in conjunction with an activated carbon packing, can be placed in any suitable housing. Preferably, this housing is manufactured from pollutant-resistant plastics material.

Figure 7:
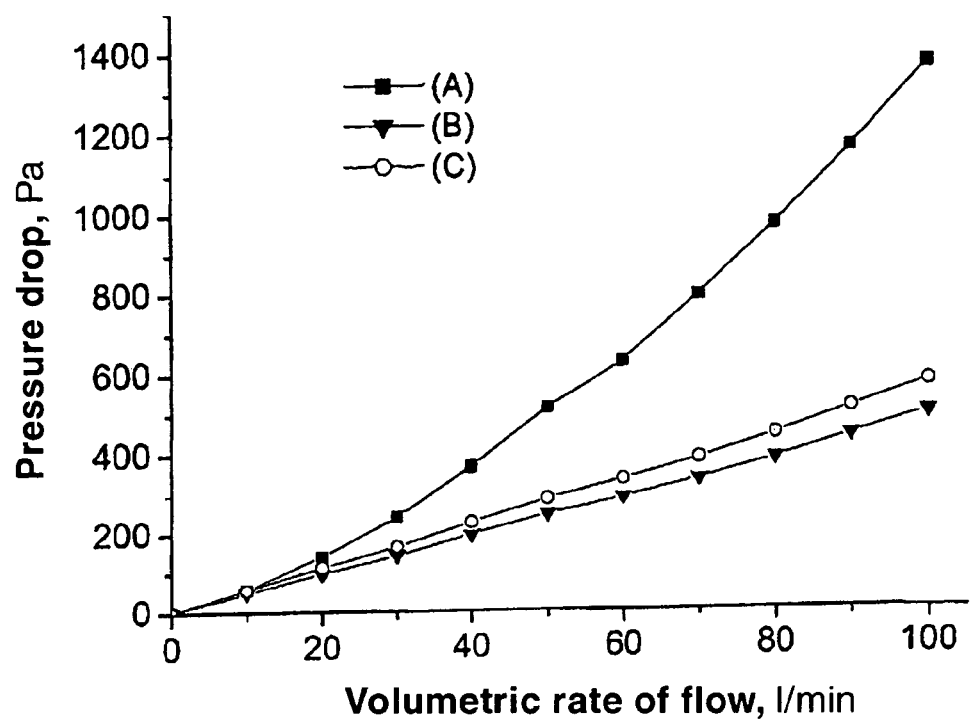
FIG. 7 shows the pressure drop as a function of the volumetric flow for an activated carbon packing or a packed bed filter in conjunction with a monolithic auxiliary filter compared with arrays of shaped activated carbon articles of the invention.

FIG. 7 depicts the pressure drop incurred across various arrangements of activated carbon filters at different volumetric flow rates. Table 3 lists the lengths and free cross-sectional areas of the various arrangements of activated carbon filters used.

TABLE 3

| Main filter | Main filter | | Additional filter 31 channels/cm$^2$ Open area: 60% | | Additional filter 62 channels/cm$^2$ Open area: 70% | | Pressure drop |
|---|---|---|---|---|---|---|---|
| | Inflow area cm$^2$ | Depth cm | Inflow area cm$^2$ | Depth cm | Inflow area cm$^2$ | Depth cm | |
| Packed bed | 21 | 10 | — | — | — | — | 689 |
| Packed bed | 21 | 10 | 7 | 10 | — | — | 789 |

TABLE 3-continued

| | Main filter | | Additional filter 31 channels/cm² Open area: 60% | | Additional filter 62 channels/cm² Open area: 70% | | |
|---|---|---|---|---|---|---|---|
| Main filter | Inflow area cm² | Depth cm | Inflow area cm² | Depth cm | Inflow area cm² | Depth cm | Pressure drop |
| Monolith with 27% open area | 21 | 20 | 7 | 10 | | | 332 |
| Monolith with 27% open area | 10.5 | 20 | 10.5 | 5 | 10.5 | 5 | 384 |

In FIG. 7, no pressure drop curve is shown for the activated carbon packing having an inflow area of 21 cm² and a depth of 10 cm listed in Table 3. In Table 3, for purposes of comparison, the pressure drop is only indicated at a volumetric flow rate of 70 l/min. It is evident from FIG. 7 that the pressure drop produced across an activated carbon packing and a downstream shaped monolithic activated carbon article (curve A) having a free cross-sectional area of 60% with 31 channels per cm² is significantly greater than that produced across the two arrays of shaped activated carbon articles comprising two (curve B) or three (curve C) shaped activated carbon articles. Curve B was determined using an array of shaped activated carbon articles according to the invention consisting of a first shaped activated carbon article having an inflow area of 21 cm², a depth of 20 cm and a free cross-sectional area of 27% (25 channels/cm²) in conjunction with a second shaped activated carbon article, which has an inflow area of 7 cm², a depth of 10 cm and a free cross-sectional area of 60% providing 31 channels per cm². Curve C was measured on an array of shaped activated carbon articles according to the invention comprising a first shaped activated carbon article having an inflow area of 10.5 cm², a depth of 20 cm and a free cross-sectional area of 27% (25 channels/cm²) in conjunction with a second shaped activated carbon article having an inflow area of 10.5 cm², a depth of 5 cm and a free cross-sectional area of 60% (31 channels/cm²) and a third shaped activated carbon article having an inflow area of 10.5 cm², a depth of 5 cm and a free cross-sectional area of 70% (62 channels/cm²).

The activated carbon packing and the shaped monolithic activated carbon article used in each case consisted of 100% by weight activated carbon. The activated carbon in the activated carbon packing had a particle size of 2 mm. In the filter arrays measured, the main filter (packed bed or shaped monolithic activated carbon article in each case having a free cross-sectional area of 27%) and the additional filters were arranged in succession. The volume to be filtered flowed through the filter arrays traversing the main filter and the first and second additional filters in that order.

It has been found that a combination of an activated carbon packing (packed bed) with a shaped monolithic activated carbon article having a free cross-sectional area of 70% results in a greater pressure drop than a combination of an activated carbon packing and a shaped monolithic activated carbon article having a free cross-sectional area of 60%. The reason for the increased pressure drop when use is made of a monolithic shaped activated carbon article having a free cross-sectional area of 70% in conjunction with an activated carbon packing is due to the greater air friction caused by the larger number of channels per cross-sectional area. Thus the overall pressure drop across an activated carbon packing in conjunction with a shaped monolithic activated carbon article having a free cross-sectional area of 70% is too large. It is evident from FIG. 7 that the pressure drop across an array of shaped activated carbon articles comprising three shaped monolithic activated carbon articles having free cross-sectional areas of 27%, 60% and 70% respectively is significantly lower than the pressure drop across an activated carbon packing in conjunction with a shaped activated carbon article having a free cross-sectional area of 60%.

In FIG. 8 and FIG. 9 the regenerability of shaped monolithic articles is shown as a function of the cell content (cpsi=cells per square inch). The use of the unit cpsi provides a measure of the number of channels per cross-sectional area. FIG. 8 illustrates the adsorptive capacity of a shaped monolithic article having 200 cpsi and a free cross-sectional area of 65% as formed by the channel cross-sections. The wall thicknesses between the channels having a square channel cross-section were 220 μm. The channels had a cross-sectional area of 1.3 mm×1.3 mm.

Figure 10:
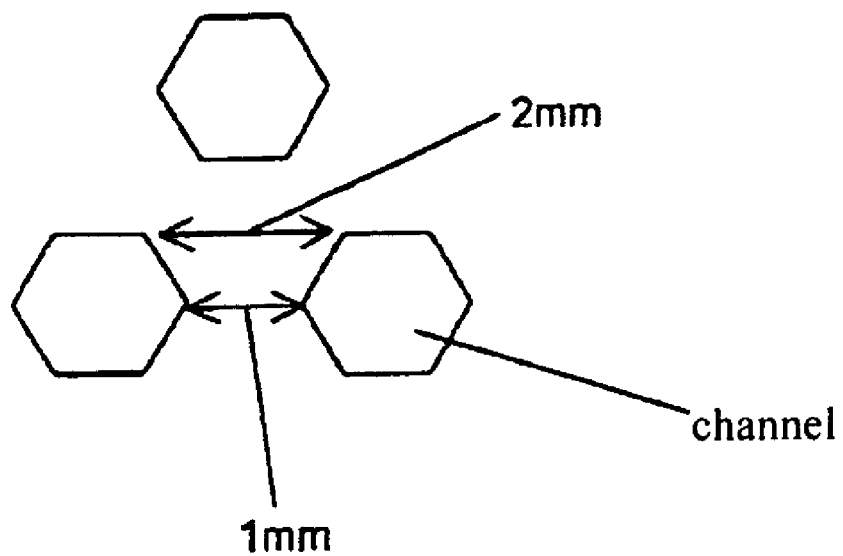
FIG. 10 is a diagrammatical representation illustrating the thicknesses of the walls situated between the hexagonal channels.

FIG. 9 illustrates the regenerability of a shaped monolithic article having a free cross-sectional area of 27% as formed by channel cross-sections. The hexagonal channel cross-section had a channel diameter of 1.4 mm. The wall thicknesses between the channels having a hexagonal cross-section were between 1 and 2 mm, as may be seen from FIG. 10.

FIG. 8 and FIG. 9 indicate, respectively, the relative filter load, based on the first load, on the ordinate axes. In the filter used for the determination of the adsorption and desorption behavior shown in FIG. 9, the absolute adsorptive capacity is of course greater than in the filter which was used to obtain the readings shown in FIG. 8. From the comparison of the adsorption and desorption values shown in FIG. 8 and FIG. 9, it is evident that the monolithic filter having wall thicknesses between 1 mm and 2 mm used in FIG. 9 has an adsorption and desorption behavior comparable to a monolithic filter having a wall thickness of 220 μm.

The working capacity or adsorptive capacity test and the power to release the adsorbed hydrocarbons by regeneration with air was determined using a test based on ASTM D 5228-92. The corresponding shaped article was loaded with n-butane, loading with a concentration of 50% of n-butane in nitrogen being carried out at a volumetric throughput rate of 0.1 l/min up to a breakthrough of 5000 ppm. Subsequently, desorption was carried out using 22 l/min of dry air over a period of 15 minutes. Several adsorption/desorption cycles were investigated.

The person skilled in the art would have expected that a monolithic filter having markedly thicker wall thicknesses, i.e. wall thicknesses of a number of millimeters, would show a significantly poorer desorption behavior. As is evident from FIG. 8 and FIG. 9, the adsorption and desorption behavior both of the monolithic filter having a free cross-sectional area of 65% and of a monolithic filter having a free cross-sectional area of 27% is between 70 and 80%, in each case based on the first filter load.

The progressive construction employing honeycomb articles having a small open area on the tank side and honeycomb articles having a large open area on the atmosphere side causes a stepped capacity for hydrocarbons. There is a high capacity on the tank side, and low capacity on the atmosphere side. This construction ensures that even at very low flushing rates, e.g. after a very short journey following filling up with fuel, those filters of the filtering system which are situated on the atmosphere inside will always be flushed free and thus will always have a free adsorption capacity for bleeding emissions.

The inventors have consequently found, surprisingly, that a monolithic activated carbon filter having a large absolute adsorptive capacity, i.e. having a low free cross-sectional area formed by the channel cross-sections of, for example, only 27% and correspondingly large wall thicknesses, which, for example, can be between 1 mm and 2 mm, has a regenerability comparable to that of a packed bed. Unlike a packed bed, however, the pressure drop is significantly lower.

Consequently, the array of shaped activated carbon articles according to the invention provides an efficient filter unit which has, on the one hand, a high adsorptive capacity and, on the other hand, a small pressure drop across the entire array of shaped activated carbon articles. Since the array of shaped activated carbon articles according to the invention preferably has a shaped monolithic activated carbon article having the greatest free cross-sectional area on the waste air side, i.e. the side facing the atmosphere or the side remote from the pollutant source, the adsorbed pollutants, for example hydrocarbons, can easily be desorbed by flushing with air in the reverse direction.

When using the array of shaped activated carbon articles according to the invention as a tank venting system in a motor vehicle, the array of shaped activated carbon articles according to the invention is flushed in the reverse direction when the motor vehicle is operated. That is to say, the air is sucked in from the environment through the array of shaped activated carbon articles according to the invention such that the adsorbed pollutants, preferably hydrocarbons, are flushed back into the engine of the motor vehicle for combustion therein. On operation of the motor vehicle, the array of shaped activated carbon articles loaded during idle periods of the motor vehicle is thus regenerated.

Thus the object underlying the invention is also achieved by the provision of a tank venting system which contains an array of shaped activated carbon articles as proposed by the invention. The array of shaped activated carbon articles according to the invention is consequently suitable for use in a tank venting system.

The object of the invention is additionally achieved by a motor vehicle which contains an array of shaped activated carbon articles according to the invention or a tank venting system according to the invention. The array of shaped activated carbon articles according to the invention and the tank venting system according to the invention are consequently suitable, in particular, for use in motor vehicles.

What is claimed is:

1. An array of shaped activated carbon articles having channels extending through said array of shaped activated carbon articles, said array comprising:
at least three shaped monolithic activated carbon articles containing channels, in which the channels are arranged so as to communicate with each other and the free cross-sectional area formed by the channel cross-sections increases in size in consecutive monolithic activated carbon articles.

2. An array of shaped activated carbon articles as defined in claim 1, wherein the content of activated carbon in the shaped activated carbon articles is at least 75% by weight, based on the total weight of the shaped activated carbon articles.

3. An array of shaped activated carbon articles as defined in claim 1, wherein the content of activated carbon in the shaped activated carbon articles is at least 80% by weight based on the total weight of the shaped activated carbon articles.

4. An array of shaped activated carbon articles as defined in claim 1, wherein the content of activated carbon in the shaped activated carbon articles is at least 95% by weight based on the total weight of the shaped activated carbon articles.

5. An array of shaped activated carbon articles as defined in claim 1, wherein said channels in said shaped activated carbon articles extend substantially parallel to each other and substantially parallel to the longitudinal axis of said shaped activated carbon article.

6. An array of shaped activated carbon articles as defined claim 1, wherein said channels independently exhibit a cross section selected from a group consisting of trigonal, tetragonal, square, pentagonal, hexagonal, octogonal, spherical, and oval cross-section.

7. An array of shaped activated carbon articles as defined in claim 1, wherein the free cross-sectional area formed by the channel cross sections increases in size in consecutive monolithic shaped activated carbon articles by from 5% to 60%.

8. An array of shaped activated carbon articles as defined in claim 1, wherein the free cross-sectional area formed by the channel cross sections in a first shaped monolithic activated carbon article is from 10% to less than 35%.

9. An array of shaped activated carbon articles as defined in claim 1, wherein the free cross-sectional sectional area formed by the channel cross sections in a second shaped monolithic activated carbon article is from 35% to not more than 60%.

10. An array of shaped activated carbon articles as defined in claim 1, wherein the free cross-sectional area formed by the channel cross sections in a third shaped monolithic activated carbon article is from more than 60% to less than 80%.

11. An array of shaped activated carbon articles as defined in claim 1, wherein the cross-sectional diameters of said channels range from 0.1 mm to 7 mm.

12. An array of shaped activated carbon articles as defined in claim 1, wherein the walls separating said channels have a thickness ranging from 0.5 mm to 10 mm.

13. An array of shaped activated carbon articles as defined in claim 1, wherein said array of shaped activated carbon articles exhibits a ratio of length to cross-sectional diameter of at least 3:1.

14. An array of shaped activated carbon articles as defined in claim 1, wherein each shaped activated carbon article exhibits an incremental adsorption capacity of more than 35 g/l at levels of n-butane in air of from 5% by volume to 50% by volume.

15. An array of shaped activated carbon articles as defined claim 1, wherein said shaped activated carbon articles in the array of shaped activated carbon articles are disposed abutting each other or at a distance from each other.

16. A tank venting system, comprising:
an array of shaped activated carbon articles having at least three shaped monolithic activated carbon articles containing channels, in which the channels are arranged so as to communicate with each other and the free cross-sectional area formed by the channel cross-sections increases in size in consecutive monolithic activated carbon articles.

17. A tank venting system as defined in claim 16, wherein the venting system contains an activated carbon packing in addition to said array of shaped activated carbon articles.

18. An array of shaped activated carbon articles as defined in claim 1, wherein the content of activated carbon in the shaped activated carbon articles is at least 90% by weight based on the total weight of the shaped activated carbon articles.

19. An array of shaped activated carbon articles as defined in claim 1, wherein the content of activated carbon in the shaped activated carbon articles is at least 98% by weight on the total weight of the shaped activated carbon articles.

20. An array of shaped activated carbon articles as defined in claim 7, wherein the free cross-sectional area formed by the channel cross sections increases in size in consecutive monolithic shaped activated carbon articles by from 10% to 50%.

21. An array of shaped activated carbon articles as defined in claim 8, wherein the free cross-sectional area formed by the channel cross sections in a first shaped monolithic activated carbon article is from 20% to 30%.

22. An array of shaped activated carbon articles as defined in claim 9, wherein the free cross-sectional area formed by the channel cross sections in a second shaped monolithic activated carbon article is from 40% to 55%.

23. An array of shaped activated carbon articles as defined in claim 10, wherein the free cross-sectional area formed by the channel cross sections in a third shaped monolithic activated carbon article is from 65% to 75%.

24. An array of shaped activated carbon articles as defined in claim 11, wherein the cross-sectional diameters of said channels range from 0.5 mm to 4.5 mm.

25. An array of shaped activated carbon articles as defined in claim 12, wherein the walls separating said channels have a thickness ranging from 0.8 mm to 5 mm.

26. An array of shaped activated carbon articles as defined in claim 13, wherein said array of shaped activated carbon articles exhibits a ratio of length to cross-sectional diameter of at least 4:1.

27. An array of shaped activated carbon articles as defined in claim 26, wherein said array of shaped activated carbon articles exhibits a ratio of length to cross-sectional diameter of at least 6:1.

28. An array of shaped activated carbon articles as defined in claim 27, wherein said array of shaped activated carbon articles exhibits a ratio of length to cross-sectional diameter of at least 8:1.

* * * * *